United States Patent
Ruppert

(10) Patent No.: US 9,688,113 B2
(45) Date of Patent: Jun. 27, 2017

(54) SYSTEM FOR ADJUSTING FRAME HEIGHT OF AN AGRICULTURAL VEHICLE

(71) Applicant: CNH Industrial America LLC, New Holland, PA (US)

(72) Inventor: Rex LeRoy Ruppert, Benson, MN (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/798,967

(22) Filed: Jul. 14, 2015

(65) Prior Publication Data

US 2017/0015174 A1     Jan. 19, 2017

(51) Int. Cl.
   *B60G 17/052*     (2006.01)
   *A01C 23/00*     (2006.01)
   *B60G 17/033*     (2006.01)
   *B60G 7/00*     (2006.01)
   *B62D 9/02*     (2006.01)

(52) U.S. Cl.
   CPC ........ *B60G 17/0525* (2013.01); *A01C 23/008* (2013.01); *B60G 7/006* (2013.01); *B60G 17/033* (2013.01); *B60G 2300/08* (2013.01); *B60G 2500/30* (2013.01); *B62D 9/02* (2013.01)

(58) Field of Classification Search
CPC ............ B60G 17/0525; B60G 2300/08; B60G 2500/30; A01C 23/008
See application file for complete search history.

(56) References Cited

U.S. PATENT DOCUMENTS

| | | | |
|---|---|---|---|
| 3,236,324 A | 2/1966 | Levratto | |
| 3,578,352 A | 5/1971 | Heine | |
| 4,619,340 A | 10/1986 | Elmer et al. | |
| 4,869,527 A * | 9/1989 | Coddens | B60G 7/02 |
| | | | 280/86.753 |
| 4,877,263 A * | 10/1989 | Konishi | B60G 17/016 |
| | | | 180/41 |
| 5,046,579 A | 9/1991 | Anderson | |
| 5,404,958 A | 4/1995 | Weiss | |
| 5,461,564 A * | 10/1995 | Collins | B60G 17/01933 |
| | | | 280/5.514 |
| 6,021,861 A | 2/2000 | Dickson | |
| 6,367,831 B1 * | 4/2002 | Lim | B60G 11/08 |
| | | | 267/242 |

(Continued)

FOREIGN PATENT DOCUMENTS

| | | |
|---|---|---|
| CN | 202573706 U | 12/2012 |
| DE | 10214915 A1 | 10/2003 |
| EP | 2058154 A1 | 5/2009 |

OTHER PUBLICATIONS

Challenger—Serious Machinery; AGCO; Jul. 2012; Issue 20.

*Primary Examiner* — Darlene P Condra
(74) *Attorney, Agent, or Firm* — Rebecca L. Henkel; Rickard K. DeMille

(57) ABSTRACT

A suspension system includes a strut coupled to an agricultural vehicle suspension system, a frame coupled to the suspension system, and a height adjustment mechanism coupled to the strut. The height adjustment mechanism is configured to transition the strut between a raised position, in which a frame height is at a first position, and a lowered position, in which the frame height is at a second position. The first position is higher than the second position relative to a surface of an agricultural field.

10 Claims, 4 Drawing Sheets

(56) References Cited

U.S. PATENT DOCUMENTS

| | | | |
|---|---|---|---|
| 6,386,554 B1 | 5/2002 | Weddle | |
| 6,530,580 B1* | 3/2003 | Simpson | B60G 3/14 |
| | | | 280/43.12 |
| 7,837,207 B2 | 11/2010 | Kremmin et al. | |
| 8,042,817 B2 | 10/2011 | Motebennur et al. | |
| 8,113,592 B2 | 2/2012 | Busley et al. | |
| 8,205,893 B2 | 6/2012 | Peterson et al. | |
| 2002/0035423 A1* | 3/2002 | Shank | B60G 17/0185 |
| | | | 701/37 |
| 2008/0252025 A1* | 10/2008 | Plath | B60G 9/003 |
| | | | 280/5.514 |
| 2014/0306414 A1* | 10/2014 | Aldrich | B62D 7/20 |
| | | | 280/124.11 |
| 2015/0102569 A1* | 4/2015 | Slawson | B60G 3/01 |
| | | | 280/5.514 |
| 2015/0273972 A1* | 10/2015 | Plath | B60G 17/019 |
| | | | 701/37 |
| 2015/0352921 A1* | 12/2015 | Dames | B60G 17/08 |
| | | | 280/5.514 |

* cited by examiner

SYSTEM FOR ADJUSTING FRAME HEIGHT OF AN AGRICULTURAL VEHICLE

BACKGROUND

The invention relates generally to agricultural vehicles and, more specifically, to a system for adjusting frame height of an agricultural vehicle.

Certain agricultural operators may conduct spraying operations to apply agricultural product (e.g., fertilizer) to agricultural fields. For example, liquid fertilizer may be stored in a tank on an agricultural sprayer and distributed over the agricultural field via spray nozzles. However, in other embodiments, dry fertilizer may be stored in the tank and mixed (e.g., with air, water, etc.) before being applied to the fields. In certain embodiments, the tank on the sprayer is refilled during spraying operations (e.g., while the sprayer is in the field). Moreover, operators may utilize high-ground clearance sprayers that are designed to accommodate the height of certain crops (e.g., the height of the sprayer frame/chassis may be above the height of the crops). However, the height of the tank of certain high-ground sprayers may be above the height of certain refilling equipment, thereby increasing the difficulty associated with refilling the tank.

BRIEF DESCRIPTION

In one embodiment a suspension system for an agricultural vehicle includes a strut. The strut includes a link having a first end and a second end. The strut also includes a pivot positioned between the first end and the second end. The pivot is configured to enable rotation of the link about a pivot axis. The system also includes a frame mount rotatably coupled to the pivot. The frame mount is configured to rigidly and non-rotatably couple to a frame of the agricultural vehicle. The system also includes a height adjustment mechanism comprising an actuator coupled to the first end of the strut and to the frame mount. The actuator is configured to drive rotation of the link about the pivot axis to control a height of the frame above a ground plane.

In another embodiment a suspension system includes a strut coupled to an agricultural vehicle suspension system, a frame coupled to the suspension system, and a height adjustment mechanism coupled to the strut. The height adjustment mechanism is configured to transition the strut between a raised position, in which a frame height is at a first position, and a lowered position, in which the frame height is at a second position. The first position is higher than the second position relative to a surface of an agricultural field.

In a further embodiment an agricultural vehicle suspension system includes a strut coupled to the vehicle suspension system. A first end of the strut is coupled to a wheel of the agricultural vehicle, and a second end of the strut is coupled to a coil spring. The system also includes a pivot of the strut positioned between the first end and the second end. The strut is configured to rotate about a pivot axis of the pivot. The system includes a frame mount configured to couple to a frame of the agricultural vehicle and rotatably coupled to the pivot. Additionally, the system includes a height adjustment system comprising a actuator coupled to a first lug disposed proximate to the first end of the strut and a second lug disposed on the frame mount. The actuator is configured to drive rotation of the strut about the pivot axis. Moreover, rotation of the strut about the pivot axis transitions the agricultural vehicle between a raised position, in which the frame is at a first height, and a lowered position, in which the frame is at second height, the first height being greater than the second height.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to a system for adjusting the frame height of an agricultural sprayer. In particular, a system for raising and lowering the frame of the agricultural sprayer during filling operations is disclosed. For example, in certain embodiments, an agricultural sprayer includes struts configured to support the frame of the agricultural sprayer as part of a suspension system. A height adjustment mechanism is coupled to the struts and configured to transition the agricultural sprayer between a raised position and a lowered position. For example, in some embodiments, the height adjustment mechanism includes an actuator configured to drive rotation of the strut about an axis to transition the agricultural sprayer between the raised position and the lowered position. In the raised position, the agricultural sprayer is in a high-clearance configuration and configured to move through the agricultural field without contacting the crops. However, in the lowered position, the agricultural sprayer is in a lowered configuration, thereby enabling refilling of the product tank(s) without the use of specialized equipment to reach the elevated height of the tank. For instance, while the agricultural sprayer is in the lowered position, a standard auger may be used to fill the tank(s). Moreover, in certain embodiments, the tank(s) may be filled without adjusting plumbing associated with the agricultural sprayer (e.g., spray nozzles, product conduits, etc.).

Figure 1:
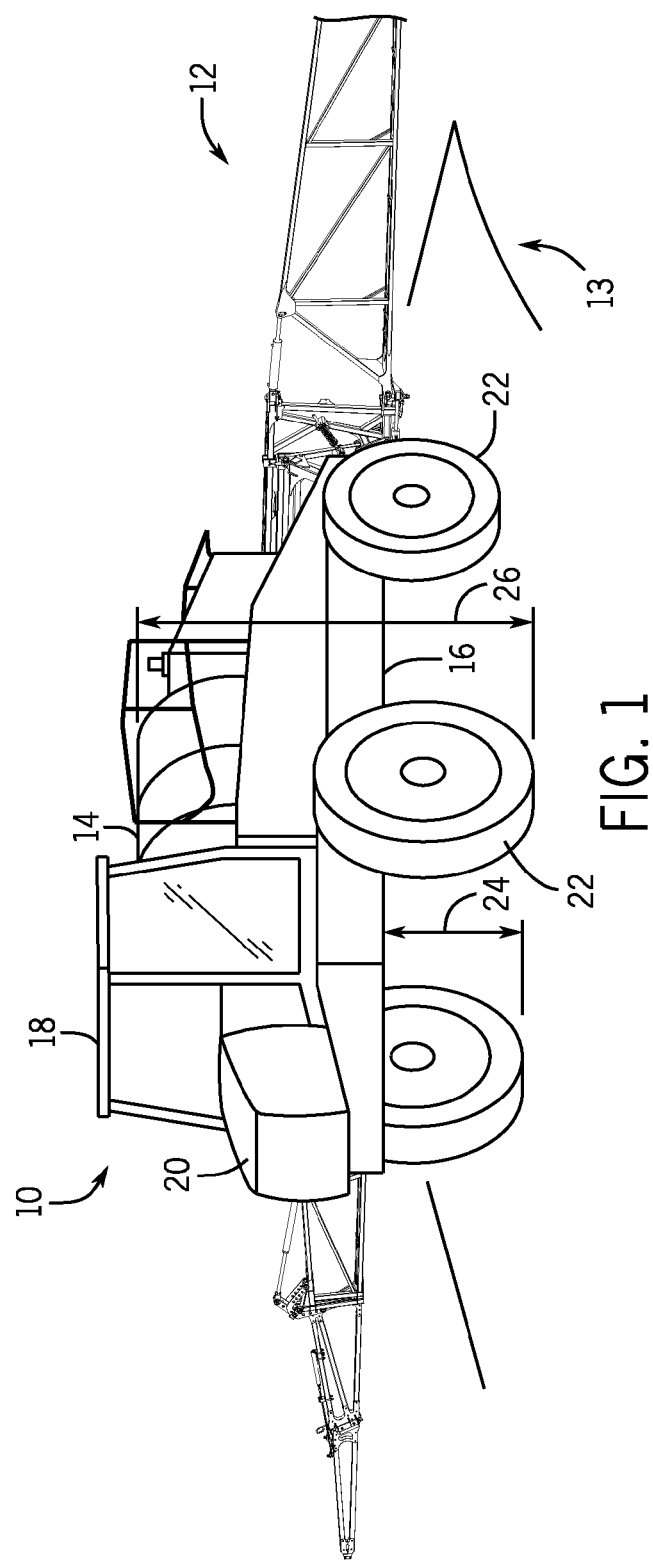
FIG. 1 is a perspective view of an embodiment of an agricultural sprayer having a height adjustment mechanism.

FIG. 1 is a perspective view of an embodiment of an agricultural vehicle 10 having a boom assembly 12 for applying agricultural product (e.g, fertilizer, pesticide, herbicide, etc.) to an agricultural field 13. The agricultural vehicle 10 includes a tank 14 in which the agricultural product is stored for distribution to the field 13. In certain embodiments, the tank 14 is configured to store liquid fertilizer, liquid pesticides, or other agricultural chemicals. However, in other embodiments, the tank 14 may be a dry box configured to hold agricultural products (e.g., dry fertilizer), which may be mixed with water, air, or the like before application to the agricultural field 13. As illustrated, the agricultural vehicle 10 also includes a frame 16, a cab 18, and a hood 20. The frame 16 provides structural support for the cab 18, the hood 20, and the tank 14. Furthermore, the cab 18 provides an enclosed space for an operator, and the hood 20 houses the engine and/or systems configured to facilitate operation of the vehicle 10. The agricultural vehicle 10 also includes wheels 22 configured to support the frame 16 and to facilitate movement of the vehicle across the field.

As mentioned above, in certain embodiments, the agricultural vehicle 10 is a high-clearance sprayer. As used herein, a high-clearance sprayer is a sprayer configured to apply agricultural product to crops with an above-average height (e.g., approximately 52 inches tall or higher). For instance, in some embodiments, ground clearance of the high-clearance sprayer may be 60 inches, 72 inches, or any other height suitable for the agricultural conditions and/or engineering conditions. However, high-clearance sprayers may also be used for shorter crops. The frame 16 is at a frame height 24 in the raised position. As mentioned above, the agricultural vehicle 10 is in the raised position while applying agricultural product to the agricultural field 13. Moreover, the tank 14 is at a tank height 26 while the agricultural vehicle 10 is in the raised position. It will be appreciated that the tank height 26 may be substantially greater than the frame height 24, leading to difficulties related to refilling the tank 14 while the agricultural vehicle 10 is in the raised position.

Figure 2:
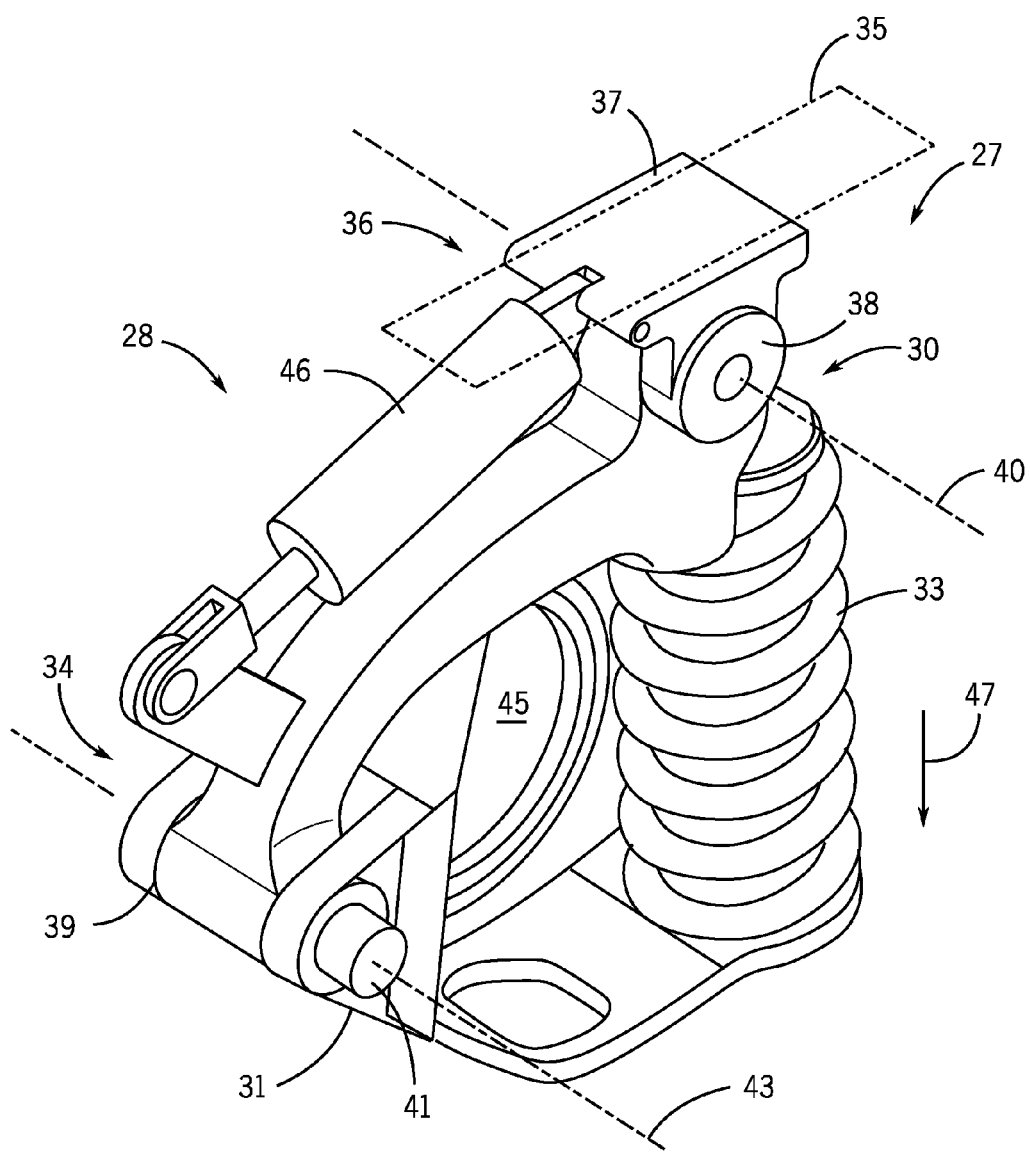
FIG. 2 is a perspective view of an embodiment of a suspension system, including a height adjustment mechanism that may be used in the agricultural sprayer of FIG. 1.

FIG. 2 is a perspective view of an embodiment of a suspension system 27 for the agricultural vehicle 10, including a height adjustment mechanism 28. In the illustrated embodiment, the suspension system 27 is a trailing link suspension system. However, in other embodiments, different suspension systems (e.g., live axle, swing axle, double wishbone, MacPherson, etc.) may be used. The suspension system 27 includes a strut 30 coupled to a bracket 31 at a first end 34 of the strut 30. Additionally, a second end 36 of the strut 30 is coupled to a spring 33. In the illustrated embodiment, the spring 33 is coupled to the bracket 31 and is configured to expand and compress in response to a force applied by the agricultural vehicle 10 (e.g., from the weight of the agricultural vehicle, from uneven terrain, etc.). Moreover, the strut 30 is configured to couple to a frame member 35 (e.g., the frame, a portion of the frame, a structural support for the agricultural vehicle 10, etc.) of the agricultural vehicle 10 via a frame mount 37 at a pivot 38. The pivot 38 is disposed between the first end 34 and the second end 36 of the strut 30. As will be described below, the pivot 38 enables the strut 30 to rotate relative to the frame mount 37 and/or the frame member 35, thereby adjusting the height of the frame 16 of the agricultural vehicle via the height adjustment mechanism 28.

In the illustrated embodiment, the bracket 31 is configured to couple to the first end 34 of the strut 30 and to the spring 33. For example, the first end 34 of the strut 30 couples to the bracket 31 via a strut interface 39. In the illustrated embodiment, the first end 34 of the strut 30 is secured to the strut interface 39 of the bracket 31 via a fastener 41 (e.g., bolt, pin, etc.). The fastener 41 is configured to enable rotation of the strut 30 about an interface axis 43, which is oriented along a lateral axis of the fastener 41. For example, the strut 30 may rotate about the interface axis 43 in response to changes in the elongation of the spring 33.

The bracket 31 includes a wheel mount 45 configured to couple the suspension system 27 to one of the wheels 22 of the agricultural vehicle 10. For instance, the wheel mount 45 may couple to a hub of the wheel 22 to secure the suspension system to the wheel 22. In the illustrated embodiment, the wheel mount 45 includes apertures for securing the wheel mount 45 to the hub. For example, the wheel mount 45 may be bolted to the hub via the apertures. However, in other embodiments, the wheel mount 45 may be welded to the hub. Accordingly, the suspension system 27 is configured to be coupled to the wheel 22 and the frame 16 of the agricultural vehicle 10. As will be described below, the height adjustment mechanism 28 is configured to move the frame 16 between the raised position and the lowered position.

Figures 3, 4:
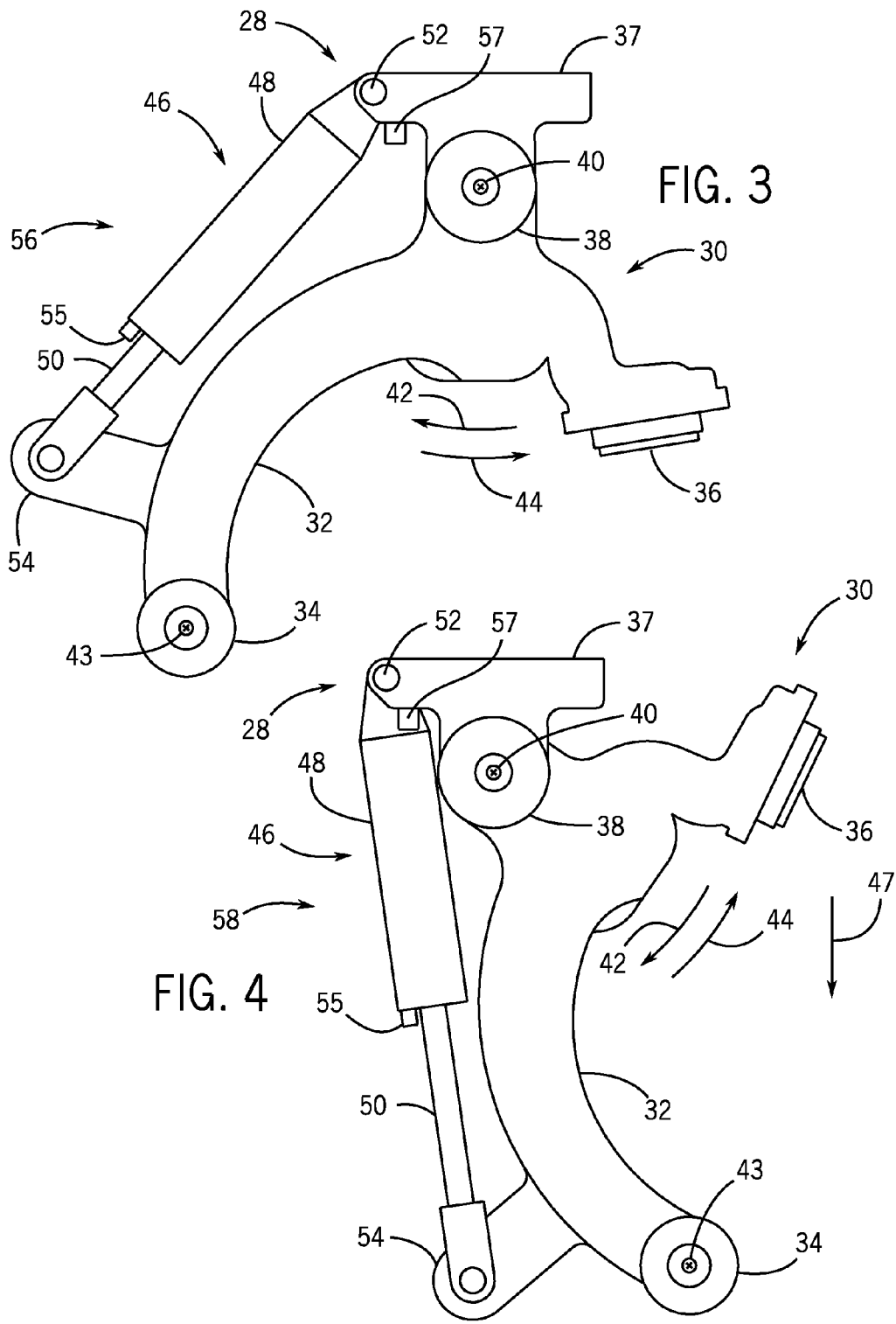
FIG. 3 is a side view of the height adjustment mechanism of FIG. 2, wherein a strut of the suspension system is in a raised position.
FIG. 4 is a side view of the height adjustment mechanism of FIG. 2, wherein a strut of the suspension system is in a lowered position.

FIG. 3 is a side view of an embodiment of the height adjustment mechanism 28 coupled to the strut 30 of the suspension system 27. For simplicity, certain details of the suspension system 27 have been omitted from the figure. The strut 30 includes a link 32 disposed between the first end 34 and the second end 36. The first end 34 is coupled to the bracket 31, as described above. In certain embodiments, the second end 36 is coupled to a damper (e.g., a rod) and the coil spring, which dissipates the energy associated with traversing rough terrain. Moreover, the strut 30 is coupled to the frame 16 via the frame mount 37. As described above, the frame mount 37 is pivotally coupled to the strut 30 via the pivot 38. In certain embodiments, the frame 16 remains substantially level (e.g., relative to the horizontal agricultural field 13) while the height adjustment mechanism 28 adjusts the height of the frame 16. However, in other embodiments, the frame 16 may tilt (e.g., transition to an angle relative to the horizontal agricultural field 13) while the height adjustment mechanism 28 adjusts the height of the frame 16. This is accomplished by controlling each height adjustment mechanism 28 independently. As will be described in detail below, the shifting and/or rotation position of the strut 30 is configured to adjust the position of the frame 16 relative to the agricultural field 13.

In the illustrated embodiment, the strut 30 includes the pivot 38 on the link 32 between the first end 34 and the second end 36. The pivot 38 is configured to enable rotation of the strut 30 relative to the frame 16, thereby adjusting the height of the frame 16 relative to the agricultural field 13. The pivot 38 is configured to rotate about a pivot axis 40. The pivot axis 40 is substantially parallel to the interface axis 43 and substantially perpendicular to a direction of travel of the agricultural vehicle 10. As such, the strut 30 is configured to rotate about the pivot axis 40 in a first direction 42 and in a second direction 44. In the illustrated embodiment, rotation about the pivot axis 40 in the first direction 42 transitions the agricultural vehicle 10 to the raised position, and rotation about the pivot axis 40 in the second direction 44 transitions the agricultural vehicle 10 to the lowered position. However, in other embodiments, rotation about the pivot axis 40 in the first direction 42 may transition the agricultural vehicle 10 to the lowered position, and rotation about the pivot axis 40 in the second direction 44 may transition the agricultural vehicle 10 the raised position.

As shown in FIG. 3, the height adjustment mechanism 28 includes an actuator 46. In the illustrated embodiment, the actuator 46 is a hydraulic cylinder with a cylinder 48, a piston (not shown) disposed within the cylinder 48, and a piston rod 50. As will be appreciated, hydraulic fluid (e.g., from a hydraulic fluid system) may drive extension and retraction of the piston rod 50. While a hydraulic cylinder is shown, in other embodiments the actuator 46 may include an electronic actuator, a mechanical pulley system, a screw device, or the like. The actuator 46 is coupled to the frame mount 37 via a first lug 52 and to the strut 30 via a second lug 54. As will be described in detail below, extension and retraction of the piston rod 50 drives rotation of the strut 30 about the pivot axis 40.

As illustrated, the height adjustment mechanism 28 is in a raised position 56. In the raised position 56, the piston rod 50 is retracted relative to the cylinder 48. As a result, the strut 30 is in a substantially upright orientation (relative to the agricultural field 13), and the agricultural vehicle 10 is in its full upright position for traveling through the agricultural field 13. As will be described in detail below, rotation of the strut 30 about the pivot axis 40 in the second direction 44 drives the agricultural vehicle to the lowered position.

In certain embodiments, the height adjustment mechanism 28 includes a position sensor 55. The position sensor 55 is configured to detect the position of the piston rod 50 relative to the cylinder 48. For example, the position sensor 55 may detect that the piston rod 50 is fully refracted, and as a result, that the agricultural vehicle 10 is in the raised position 56. In certain embodiments, the position sensor 55 is a Hall effect sensor that detects the position of the piston rod 50 based on a magnetic material incorporated into the piston rod 50. However, other types of position sensors 55 may be used, such as capacitive sensors, ultrasonic sensors, potentiometers, linear variable differential transformers, and the like. As will be appreciated, a variety of sensors may be employed to determine the linear displacement of the piston rod 50 relative to the cylinder 48. As will be described in detail below, the position sensor 55 may send a signal to a control system to monitor the position of the frame 16 relative to the agricultural field 13.

In the illustrated embodiment, the height adjustment mechanism 28 includes a locking mechanism 57. For instance, the locking mechanism 57 may be a valve positioned at the cylinder 48 configured to block flow of hydraulic fluid into and/or out of the cylinder 48 (e.g., to block the flow of the hydraulic fluid to the rod side or the cap side of the cylinder 48). For example, while the agricultural vehicle 10 is traveling through the agricultural field 13, the control system may send a signal to the locking mechanism 57 to block the flow of hydraulic fluid into the cylinder 48 (e.g., to block the flow of the hydraulic fluid to the cap side), thereby maintaining the agricultural vehicle 10 in the raised position 56. Moreover, in another embodiment, the locking mechanism may be a pin (e.g., controlled by a solenoid) that blocks rotation of the strut 30 about the pivot axis 40. The locking mechanism 57 is configured to block movement of the vehicle 10 from the raised position 56 to the lowered position and/or from the lowered position to the raised position 56.

It will be appreciated that, while the illustrated embodiment describes the raised position 56 as including theretracted piston rod 50, in some embodiments the piston rod 50 may be extended while the agricultural implement 10 is in the raised position. For example, the orientation of the actuator 46 may be reversed without changing the operation of the height adjustment mechanism 28.

FIG. 4 is a side view of the height adjustment mechanism 28 coupled to the strut 30, in which the strut 30 is in a lowered position 58. As shown, the piston rod 50 is extended out of the cylinder 48 of the actuator 46. As a result, the strut 30 is rotated about the pivot axis 40 in the second direction 44 to the illustrated orientation. Because the wheel mount 45 fixes the bracket 31 to the wheel, rotation of the strut 30 about the pivot 38 in the second direction 44 drives the frame mount 37 in a downward direction 47 (e.g., toward the agricultural field 13) and lowers the frame 16 relative to the agricultural field 13. Accordingly, the tank height 26 is also lowered due to the coupling between the frame 16 and the tank 14. In the illustrated embodiment, the frame mount 37 remains in a substantially horizontal orientation (e.g., parallel to the agricultural field 13) while the strut 30 transitions between the raised position 56 and the lowered position 58. However, in alternative embodiments, the frame mount 37 may tilt (e.g., at an angle relative to the agricultural field) while the strut 30 transitions between the raised position 56 and the lowered position 58.

In certain embodiments, height adjustment mechanisms 28 are coupled to each strut 30. However, in other embodiments, the height adjustment mechanisms 28 may be on only one side of the vehicle. For example, the height adjustment mechanisms 28 may be coupled to the struts 30 at the front of the vehicle 10 only. As a result, the front portion of the agricultural vehicle 10 may be transitioned to the lowered position 58 while the rear portion of the agricultural vehicle 10 remains in the raised position 56. For instance, the front end of the agricultural vehicle 10 may be substantially closer to the surface of the agricultural field 13 than the rear end while the vehicle 10 is in the lowered position 58. It will be appreciated that the number of height adjustment mechanisms 28, the locations of the height adjustment mechanisms 28, and the length of the piston rods 50, among other parameters, may vary in alternative embodiments.

Figure 5:
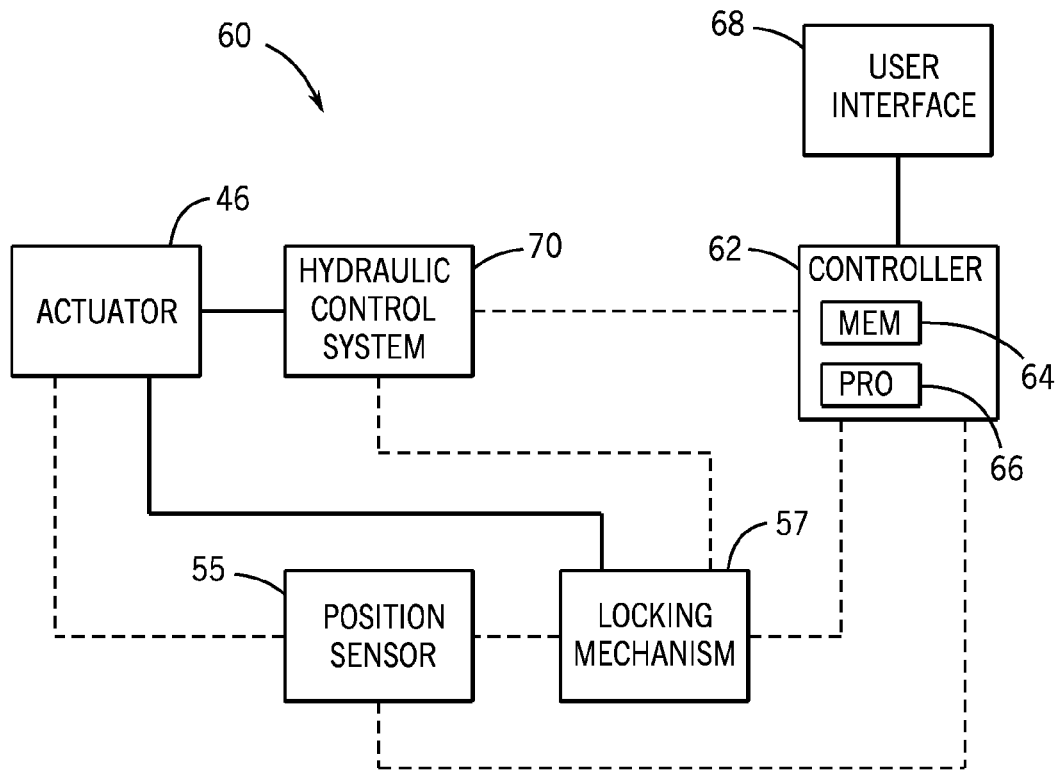
FIG. 5 is a block diagram of an embodiment of a control system for controlling a height adjustment mechanism.

FIG. 5 is a block diagram of an embodiment of a control system 60 for controlling the height adjustment mechanism 28. In the illustrated embodiment, the control system 60 includes a controller 62 having a memory 64 and a processor 66, and a user interface 68. The memory 64 may be any type of non-transitory machine readable medium for storing data and executable instructions, such as random-access memory, read-only memory, rewritable flash memory, hard drives, optical discs, and the like. The processor 66 may execute instructions stored in the memory 64. For example, the memory 64 may contain machine readable code, such as instructions, that may be executed by the processor 66. In some embodiments, the memory 64 and processor 66 may enable automatic (e.g., processor/memory controlled) operation of the height adjustment mechanism 28.

The operator may interact with the user interface 68 to send an operation signal to the controller 62. For example, the operator may depress a button on the user interface 68 to send an operation signal to the controller 62 indicative of a command to drive the strut 30 into the lowered position. The controller 62 is configured to send a control signal to a hydraulic control system 70 to drive the actuator 46. For example, the hydraulic control system 70 may include a valve that controls hydraulic fluid flow to/from the actuator 46. Accordingly, directing the valve to a first position may enable fluid to flow into the cylinder 48 (e.g., directing the flow of the hydraulic fluid to the cap side) of the actuator 46, thereby facilitating rotation of the strut 30 about the pivot axis 40 in the second direction 44. As a result, the agricultural vehicle 10 may transition from the raised position 56 to the lowered position 58. Moreover, in certain embodiments, the hydraulic control system 70 may direct the valve to a second position to enable fluid to flow out of the cylinder 48 (e.g., directing the flow of the hydraulic fluid out of the cap side and into the rod side) of the actuator 46, thereby facilitating rotation of the strut 30 about the pivot axis 40 in the first direction 42. In certain embodiments, the user interface 68 may be a keypad and/or touch-screen that the operator interacts with while outside the cab 18 of the agricultural vehicle 10. For instance, the operator may delay moving the agricultural vehicle 10 to the lowered position 58 until after the operator has exited the cab 18 and placed auxiliary equipment (e.g., augers, storage tanks, etc.) in a desired location for refilling the tank 14. However, the user interface 68 may be positioned within the cab 18 of the agricultural vehicle 10, thereby enabling the operator to control the vertical position of the agricultural vehicle 10 from within the cab 18.

As mentioned above, the position sensor 55 is configured to monitor the position of the actuator 46 (e.g., the position of the piston rod 50 relative to the cylinder 48), and to output a signal indicative of the position of the agricultural vehicle 10 with respect to the agricultural field 13 to the controller 62. For example, the position sensor 55 may detect the agricultural vehicle 10 is in the lowered position 58 by determining that the piston rod 50 is substantially extended relative to the cylinder 48. The controller 62 may output a signal indicative of the position of the agricultural vehicle 10 to the user interface 68 to inform the operator.

In the illustrated embodiment, the locking mechanism 57 is communicatively coupled to the position sensor 55, the hydraulic control system 70, and the controller 62. The locking mechanism 57 is configured to receive instructions from the controller 62 based on signals received from associated equipment. For instance, the locking mechanism 57 may receive a signal indicating that the agricultural vehicle 10 is in the lowered position 58. As a result, the locking mechanism 57 may send a signal to the hydraulic control system 70 to block hydraulic fluid flow out of the actuator 46 (e.g., blocking the flow of the hydraulic fluid out of the cap side), thereby blocking retraction of the piston rod 50 and movement to the raised position 56. Moreover, the locking mechanism 57 may send a signal to the hydraulic control system 70 to enable hydraulic fluid flow to the actuator 46, thereby blocking retraction of the piston rod 50 and movement to the raised position 56. Moreover, in certain embodiments, the locking mechanism 57 may automatically activate according to operational conditions. For example, the locking mechanism 57 may receive a signal indicating that the pressure in the hydraulic fluid lines is low (e.g., due to a fluid leak). As a result, the locking mechanism 57 may lock the actuator 46 (e.g., with a pin), thereby blocking movement to the lowered position 58, which enables the agricultural vehicle 10 to continue traveling through the agricultural field 13 in the raised position 56. Moreover, activation of the locking mechanism 57 may also block movement to the raised position 56 from the lowered position 58. As mentioned above, the locking mechanism 57 may incorporate one or more configurations (e.g., pins, block valves) to block rotation of the strut 30 about the pivot axis 40.

Figure 6:
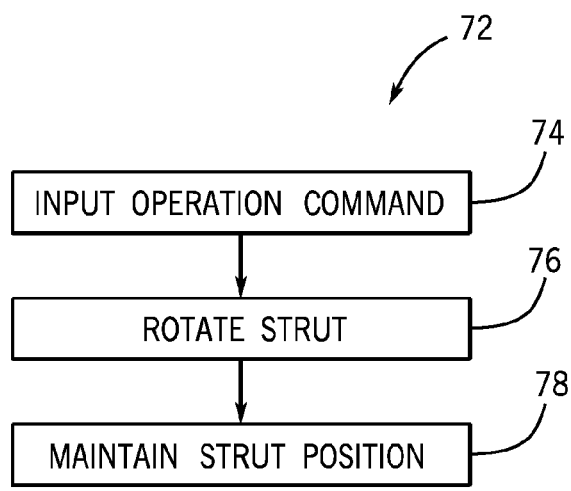
FIG. 6 is a flow chart of an embodiment of a method of controlling a height adjustment mechanism.

FIG. 6 is a flow chart of an embodiment of a method 72 for transitioning the vehicle 10 between the raised position 56 and the lowered position 58. The controller 62 outputs a signal to the actuator 46 indicative of a command to transition to the lowered position 58 at block 74. For example, the operator may input the command into the user interface 68. As a result, the controller 62 may send a corresponding signal to the hydraulic control system 70 to open a valve, thereby enabling flow of hydraulic fluid into the cylinder 48 (e.g., enabling the flow of the hydraulic fluid to the cap side). The strut 30 rotates about the pivot axis 40 at block 76. For example, as described above, transitioning to the lowered position 58 enables the strut 30 to rotate in the second direction about the pivot axis 40. To this end, the frame member 37 and the frame 16 are transitioned to the lowered position 58. Thereafter, the controller 62 may output a signal to the actuator 46 to maintain the strut 30 in the lowered position 58 until another signal is received at block 78. For instance, the controller 62 may send a signal to the hydraulic control system 70 blocking flow of hydraulic fluid out of the actuator 46 (e.g., blocking the flow of the hydraulic fluid out of the cap side) until a signal is received (e.g., from the operator) indicative of a command to transition the strut 30 back to the raised position. In certain embodiments, the locking mechanism 76 may be activated to block operation of the height adjustment mechanism 28. As a result, the control system 60 may be utilized to control operation of the height adjustment mechanism 28.

As described above, the disclosed embodiments include the height adjustment mechanism 28 configured to adjust the frame height 24 of the agricultural vehicle 10 relative to the agricultural field 13. The height adjustment mechanism 28 is coupled to the strut 30 of the suspension system. In certain embodiments, the height adjustment mechanism 28 includes the actuator 46 configured to drive rotation of the strut 30 about the pivot axis 40. For example, the actuator 46 may be a hydraulic cylinder that drives the strut 30 to rotate, and thereby the frame 16, from the raised position 56 to the lowered position 58. Moreover, in certain embodiments, the height adjustment mechanism 28 includes the control system 60 configured to direct operation of the actuator 46.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A suspension system comprising:
    a strut having a link and a pivot, wherein the link has a first end and a second end, the link is coupled to a wheel support bracket at the first end, the link is coupled to a spring at the second end, the pivot is positioned between the first end and the second end, the pivot is configured to enable the link to rotate in a first direction about a pivot axis to transition a frame to a raised position and to rotate in a second direction about the pivot axis to transition the frame to a lowered position, the second direction is opposite the first direction, and the raised position of the frame is higher above a surface of a field than the lowered position; and
    a height adjustment mechanism coupled to the link at a location remote from the pivot, wherein the height adjustment mechanism is configured to drive the link to rotate in the first direction and in the second direction.

2. The suspension system of claim 1, comprising a control system communicatively coupled to the height adjustment mechanism, wherein the control system is configured to control operation of an actuator of the height adjustment mechanism.

3. The suspension system of claim 2, wherein the actuator comprises a hydraulic cylinder.

4. The suspension system of claim 2, comprising at least one sensor configured to output a first signal to the control system, wherein the control system is configured to operate the actuator based on a second signal received from the at least one sensor.

5. The suspension system of claim 4, wherein the sensor comprises a Hall effect sensor, a capacitive sensor, an ultrasonic sensor, or a combination thereof.

6. A suspension system for an agricultural vehicle, comprising:
a strut having a link and a pivot, wherein the link has a first end and a second end, the link is coupled to a wheel support bracket at the first end the link is coupled to a coil spring at the second end, the pivot is positioned between the first end and the second end, and the link is configured to rotate about a pivot axis of the pivot;
a frame mount rotatably coupled to the pivot and configured to couple to a frame; and
a height adjustment system comprising an actuator, wherein the actuator is coupled to the frame mount, the actuator is coupled to the link at a mounting point between the first end and the pivot and the actuator is configured to drive rotation of the link about the pivot axis;
whereby rotation of the link about the pivot axis transitions the agricultural vehicle between a raised position, in which the frame is at a first height, and a lowered position, in which the frame is at a second height, the first height being greater than the second height.

7. The suspension system of claim 6, wherein the actuator comprises a hydraulic cylinder.

8. The suspension system of claim 7, comprising a locking mechanism configured to block rotational movement of the link about the pivot axis.

9. The suspension system of claim 6, wherein the actuator comprises a hydraulic cylinder configured to drive rotation of the link about the pivot axis in a first direction and in a second direction, opposite the first direction, wherein rotation of the link in the first direction is configured to transition the agricultural vehicle to the raised position and rotation of the link in the second direction is configured to transition the agricultural vehicle to the lowered position.

10. The suspension system of claim 6, comprising a control system communicatively coupled to the height adjustment mechanism, wherein the control system is configured to control operation of the actuator.

* * * * *